(12) United States Patent
Nishimura et al.

(10) Patent No.: US 10,943,135 B2
(45) Date of Patent: Mar. 9, 2021

(54) INFORMATION PROCESSING APPARATUS, IMAGE DELIVERY SYSTEM, INFORMATION PROCESSING METHOD, AND COMPUTER-READABLE RECORDING MEDIUM

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 16/266,473

(22) Filed: Feb. 4, 2019

(65) Prior Publication Data

US 2019/0266424 A1    Aug. 29, 2019

(30) Foreign Application Priority Data

Feb. 27, 2018    (JP) .............................. JP2018-033527

(51) Int. Cl.
| | |
|---|---|
| *G06K 9/00* | (2006.01) |
| *G06Q 30/02* | (2012.01) |
| *G06T 7/20* | (2017.01) |
| *G08G 1/04* | (2006.01) |

(52) U.S. Cl.
CPC ..... *G06K 9/00825* (2013.01); *G06Q 30/0283* (2013.01); *G06T 7/20* (2013.01); *G08G 1/04* (2013.01); *G06K 2209/23* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2003/0220835 | A1* | 11/2003 | Barnes, Jr. .......... | G06F 3/04842 705/14.36 |
| 2008/0255722 | A1* | 10/2008 | McClellan ............. | G07C 5/008 701/31.4 |
| 2011/0161116 | A1* | 6/2011 | Peak ...................... | G01C 21/36 705/4 |

FOREIGN PATENT DOCUMENTS

| | | | | |
|---|---|---|---|---|
| JP | 2007-078600 A | | 3/2007 | |
| JP | 2007-207260 A | | 8/2007 | |
| JP | 2007193487 A | * | 8/2007 | |
| JP | 2012-094972 A | | 5/2012 | |
| JP | 2013-068426 A | | 4/2013 | |
| JP | 2013250647 A | * | 12/2013 | .............. G06Q 30/06 |
| JP | 2015049598 A | * | 3/2015 | |
| JP | 2017116998 A | * | 6/2017 | |

* cited by examiner

*Primary Examiner* — Jiangeng Sun
(74) *Attorney, Agent, or Firm* — Oliff PLC

(57) ABSTRACT

An information processing apparatus includes at least one processor configured to determine, on the basis of information concerning traveling of a vehicle obtained when an image is taken by an image pickup unit of the vehicle, a scene present when the image is taken; and transmit information indicating the determined scene and the image to a terminal connected to the information processing apparatus via a network.

15 Claims, 6 Drawing Sheets

FIG.5

| IMAGE ID | IMAGE | TAG | | | | SALES PRICE | USER ID |
|---|---|---|---|---|---|---|---|
| | | ADDED INFORMATION (DATE AND TIME, POSITION, VEHICLE INFORMATION) | OBJECT | ENVIRONMENT INFORMATION | SCENE | | |
| 0001 | IMAGE A | DATE AND TIME A, POSITION A, VEHICLE INFORMATION A | VEHICLE A, VEHICLE B | ENVIRONMENT INFORMATION A | ACCIDENT | PRICE A | USER A |
| ... | ... | ... | ... | ... | ... | ... | ... |

INFORMATION PROCESSING APPARATUS, IMAGE DELIVERY SYSTEM, INFORMATION PROCESSING METHOD, AND COMPUTER-READABLE RECORDING MEDIUM

BACKGROUND OF THE INVENTION

1. Field of the Invention

The present invention relates to an information processing apparatus, an image delivery system, an information processing method, and a computer-readable recording medium.

2. Description of the Related Art

According to the related art, an image taken (by photography) by a traveling vehicle is uploaded to a server; a scene at a plane where the image is taken is reported to a user who is remote from the place. In this regard, also according to the related art, in response to a request from a user who is outside a vehicle, an image in the surroundings of the vehicle is uploaded to an image server that delivers the image to the user (for example, see Japanese Laid-open Patent Application No. 2007-207260).

SUMMARY OF THE INVENTION

According to an embodiment of the present invention, an information processing apparatus includes at least one processor configured to determine, on the basis of information concerning traveling of a vehicle obtained when an image is taken by an image pickup unit of the vehicle, a scene present when the image is taken; and transmit information indicating the determined scene and the image to a terminal connected to the information processing apparatus via a network.

Other objects, features and advantages of the present invention will become more apparent from the following detailed description when read in conjunction with the accompanying drawings.

BRIEF DESCRIPTION OF THE DRAWINGS

FIG. 5 illustrates one example of image information according to the embodiment; and FIG. 6 illustrates an example of a display screen of a terminal for a user to purchase an image or the like.

DETAILED DESCRIPTION OF THE EMBODIMENTS

Figure 1:
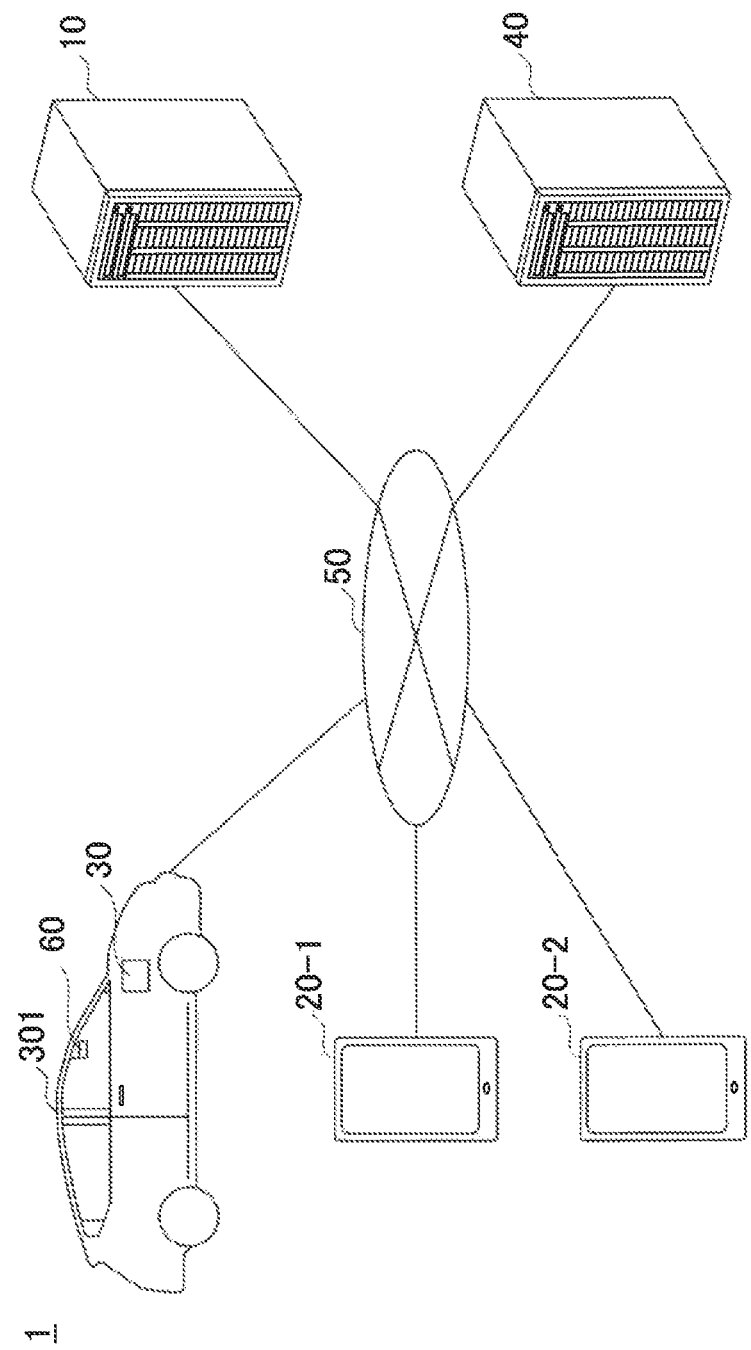
FIG. 1 illustrates a configuration example of an image delivery system according to an embodiment.

In the related art described above, it may be difficult for a user to select an image to be delivered from among a plurality of images.

An embodiment of the present invention has been devised in consideration of this point, and an object of the embodiment is to provide a technology enabling a relatively easy selection of an image to be delivered from among a plurality of images.

An information processing apparatus according to an embodiment of the present invention includes at least one processor configured to determine, on the basis of information concerning traveling of a vehicle obtained when an image is taken (by photography) by an image pickup unit of the vehicle, a scene present when the image is taken; and transmit information indicating the determined scene and the image to a terminal connected to the information processing apparatus via a network.

As a result, for example, a user can select an image to be delivered on the basis of information indicating a scene. Accordingly, a user can relatively easily select an image to be delivered from among a plurality of images.

In an information processing apparatus according to another embodiment of the present invention, the information concerning traveling of the vehicle includes at least one of a traveling speed of the vehicle, an acceleration of the vehicle, information concerning a driver's driving operation of the vehicle, and information indicating actuating of a predetermined traveling function of the vehicle.

As a result, for example, a user can select an image to be delivered on the basis of information indicating a scene determined on the basis of information concerning traveling of the vehicle. Accordingly, a user can relatively easily select an image to be delivered from among a plurality of images.

In an information processing apparatus according to yet another embodiment of the present invention, the at least one processor is further configured to determine the scene present when the image is taken on the basis of a result of image recognition of the image and information of surroundings of the vehicle corresponding to a date and time when the image is taken and a position where the image is taken.

As a result, for example, a user can select an image to be delivered on the basis of information indicating a scene determined on the basis of information of a disaster or the like occurring in the surroundings of the vehicle and an object detected from the image. Accordingly, a user can relatively easily select an image to be delivered from among a plurality of images.

In an information processing apparatus according to yet another embodiment of the present invention, the at least one processor is further configured to decide a sales price of the image on the basis of the determined scene, and transmit, to the terminal, the image with the information indicating the determined scene and information indicating the sales price attached to the image.

As a result, for example, a user can purchase an image to be delivered at a price decided on the basis of information indicating a scene. Accordingly, a user can relatively easily select an image to be delivered from among a plurality of images, and also, can pay a price corresponding to a scene of the image to a user or the like who has provided the image.

In an information processing apparatus according to a yet another embodiment of the present invention, the at least one processor is further configured to decide the sales price on the basis of an occurrence frequency of the determined scene.

As a result, for example, a user can purchase an image to be delivered at a price decided on the basis of an occurrence frequency of a scene of the image. Accordingly, a user can relatively easily select an image to be delivered from among a plurality of images, and also, can pay a price corresponding to an occurrence frequency of a scene of the image to a user or the like who has provided the image.

In an information processing apparatus according to a yet another embodiment of the present invention, the at least one processor is further configured to decide a higher sales price as a date and time when the image is taken is later or as a difference between the date and time when the image is taken and a date and time when a predetermined event occurs at a position where the image is taken is smaller.

As a result, for example, a user can purchase an image to be delivered at a price decided on the basis of date and time when the image is taken. Accordingly, a user can relatively easily select an image to be delivered from among a plurality of images, and also, can pay a price corresponding to date and time when the image is taken to a user or the like who has provided the image. Other embodiments are implemented as an image delivery system, an information processing method, and a computer-readable recording medium.

According to the embodiments of the present invention, a user can relatively easily select an image to be delivered from among a plurality of images.

Below, an embodiment of the present invention will be described on the basis of drawings.

<System Configuration>

FIG. 1 illustrates a configuration example of an image delivery system according to the embodiment. In FIG. 1, the image delivery system 1 includes a server 10, terminals 20-1 and 20-2 (hereinafter, for a case where the terminals need not be distinguished therebetween, each of which will be simply referred to as a "terminal 20"), an in-vehicle apparatus 30 of a vehicle 301, and an external server 40. Note that the number of the terminals 20 is not limited to two.

The server 10 and each of the terminal a 20, the in-vehicle apparatus 30, and the external server 40 are connected to perform communication therebetween through, for example, a network 50 such as the Internet, a mobile telephone network, a wireless LAN (Local Area Network), a LAN, or the like.

The in-vehicle apparatus 30 is, for example, an ECU (Electronic Control Unit) or the like installed in the vehicle 301, and is connected to a drive recorder 60 (that is an example of an "image pickup unit"), a communication apparatus, and so forth. The in-vehicle apparatus 30 stores added information such as the speed, the position, and so forth of the vehicle 301 and a roving image taken (by photography) by the drive recorder 60 in a recording medium such as a SD card, and uploads the added information and the moving image to the server 10.

The terminal 20 is, for example, an information processing apparatus (i.e., a computer) such as a smartphone, a tablet PC (Personal Computer), or a notebook-size PC. A terminal 20 transmits a frame selected by the user from among frames of a moving image taken (by photography) by the drive recorder 60 to the server 10. In addition, a terminal 20 purchases from the server 10 an image that is searched on the basis of a tag indicated by the user from among a plurality of images uploaded to the server 10.

The server 10 is, for example, an information processing apparatus for a server, and provides a service such as image delivery to a terminal 20. The server 10 attaches a tag to an image taken (by photography) by the vehicle 301 so that a terminal 20 can search for an image on the basis of a tag.

The external server 40 responds to a request from the server 10 to deliver to the server 10 information of the climate at a predetermined date and time and place, information of a disaster (or an accident), or the like.

<Hardware Configuration>

Figure 2:
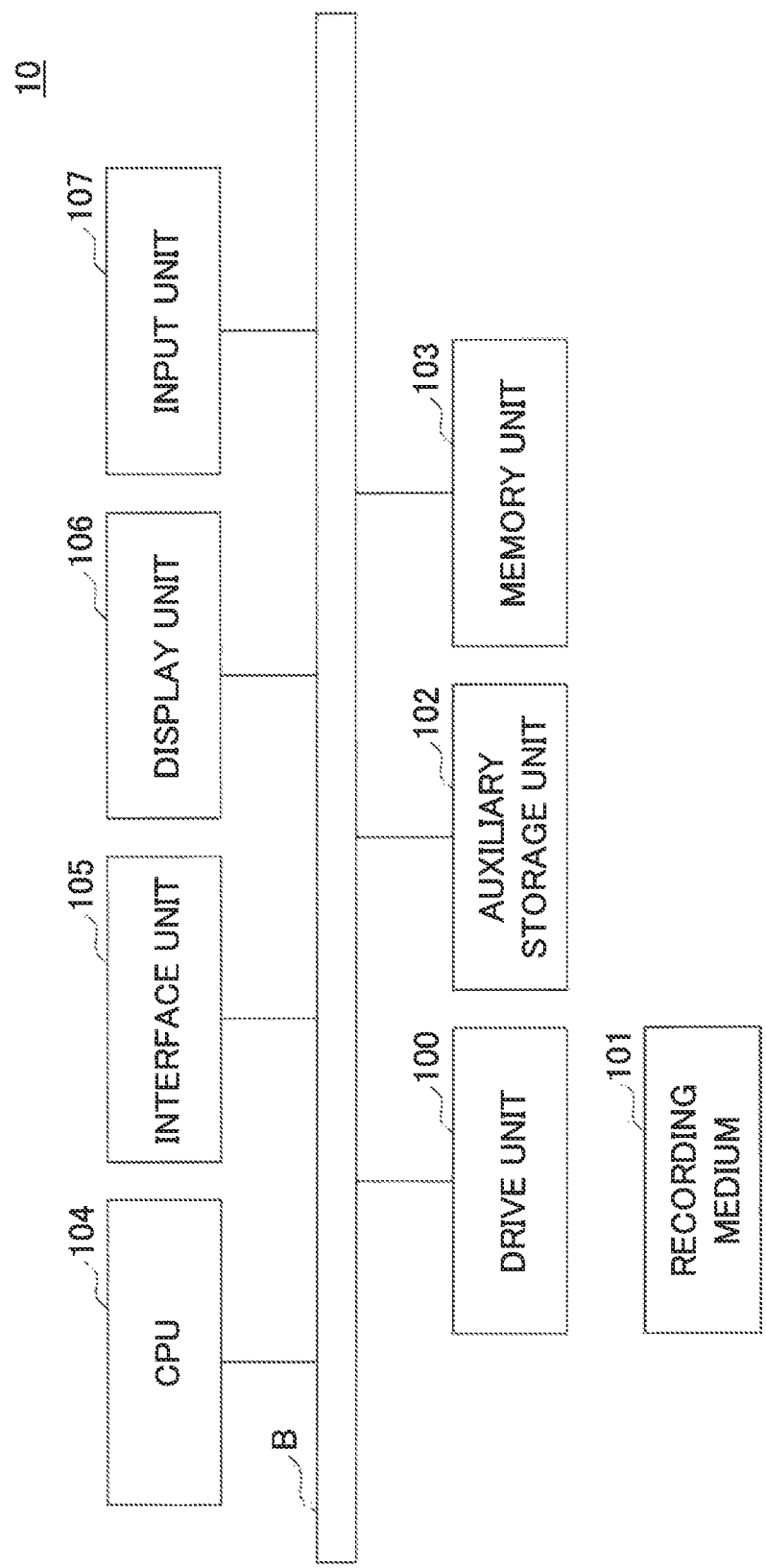
FIG. 2 illustrates a hardware configuration example of a server according to the embodiment.

FIG. 2 illustrates a hardware configuration example of the server 10 according to the embodiment. The server 10 of FIG. 2 includes a drive unit 100, an auxiliary storage unit 102, a memory unit 103, a CPU 104, an interface unit 105, and so forth that are connected with each other by a bus B.

An information processing program to implement processes of the server 10 is provided through, for example, a recording medium 101. In response to setting of the recording medium 101 to the drive unit 100, the information processing program having been recorded in the recording medium 101, the information processing program is installed in the auxiliary storage unit 102 from the recording medium 101 via the drive unit 100. However, installing of the information processing program is not necessarily implemented through the recording medium 101 and may be downloaded from another computer via a network. The auxiliary storage unit 102 stores the installed information processing program, and also stores necessary files, data, and so forth.

The memory unit 103 is, for example, a RAM (Random access memory), and, in response to an input of an instruction to start a program, reads the program from the auxiliary storage unit 102 and stores the program. The CPU 104 implements functions of the server 10 according to the program stored in the memory unit 103. The interface unit 105 is used as an interface to connect to a network.

Note that, examples of the recording medium 101 include portable recording media such as a CD-ROM, a DVD, and a USB memory. Examples of the auxiliary storage unit 102 include a HDD (Hard Disk Drive), a flash memory, and so forth. Each of the recording medium 101 and the auxiliary storage unit 102 corresponds to a computer-readable recording medium.

Note that the hardware configurations of the terminals 20, the in-vehicle apparatus 30, and the external server 40 may be the same as or similar to the hardware configuration of the server 10.

<Functional Configuration>

Figure 3:
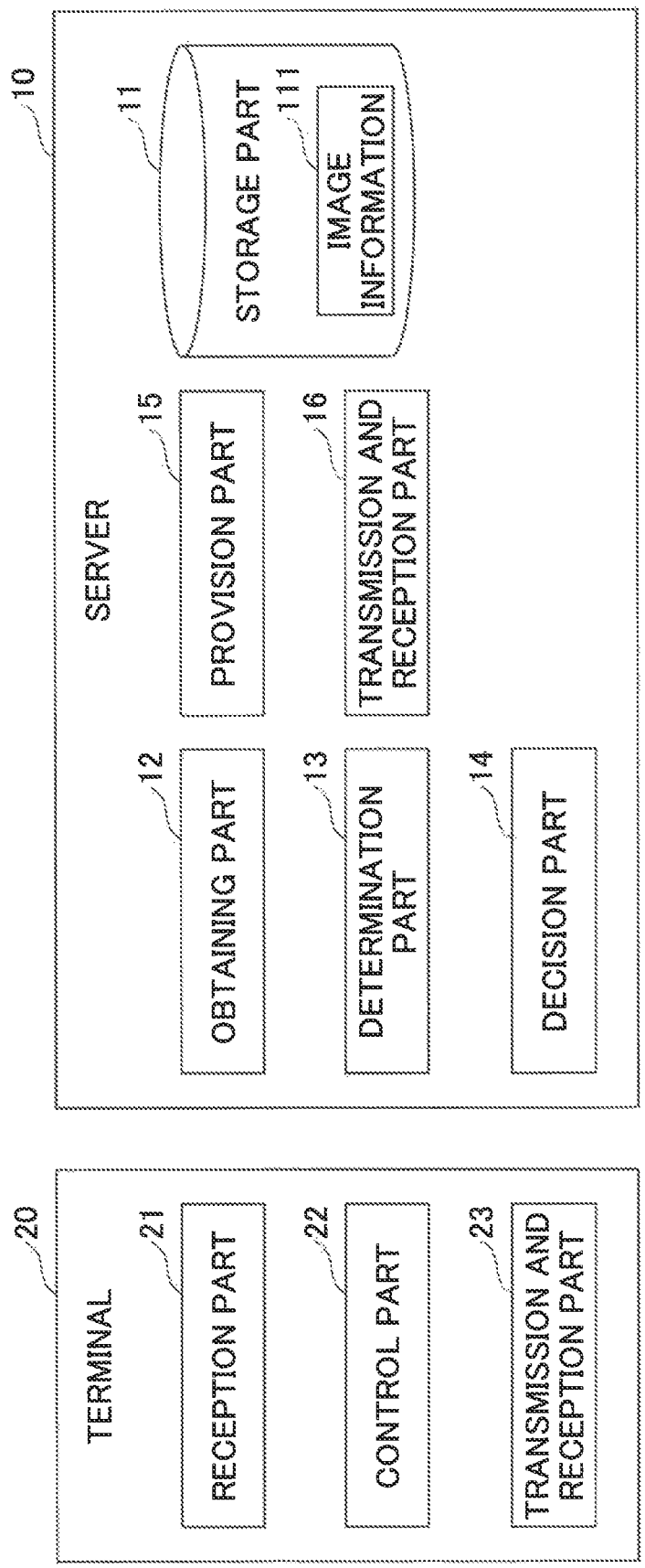
FIG. 3 is one example of a functional block diagram of the server and a terminal according to the embodiment.

Next, with reference to FIG. 3, functional configurations of the terminals 20 and the server 10 according to the embodiment will be described. FIG. 3 is one example of a functional block diagram of the server 10 and a terminal 20 according to the embodiment.

«Server 10»

The server 10 includes a storage part 11. The storage part 11 is implemented by, for example, the auxiliary storage unit 102. The storage part 11 stores image information 111 and so forth. Data included in the image information 111 will be described later.

The server 10 further includes an obtaining part 12, a determination part 13, a decision part 14, a provision part 15, and a transmission and reception part 16. The obtaining part 12, the determination part 13, the decision part 14, the provision part 15, and the transmission and reception part 16 represent functions implemented by processes performed by the CPU 104 of the server 10 according to one or more programs installed in the server 10.

The obtaining part 12 obtains an image that is taken by an image pickup unit (i.e., the drive recorder 60) of the in-vehicle apparatus 30, and obtains the date and time, position, and information concerning traveling of the vehicle 301, in which the in-vehicle apparatus 30 is installed, at a time when the image is taken.

The determination part 13 determines, on the basis of information concerning traveling of the vehicle 301, a scene present when an image is taken (by photography). In this regard, examples of a scene present when an image is taken (by photography) include, for example, scenes concerning driving and traveling of the vehicle 301 and scenes concerning traffic such as an accident and a traffic jam occurring in the surroundings of the vehicle 301. In addition, the determination part 13 determines a scene present when an image is taken (by photography) on the basis of the image obtained by the obtaining part 12 and information of surroundings of the vehicle corresponding to the date and time and position at which the image is taken.

The decision part 14 decides sales price of an image on the basis of a scene determined by the determination part 13 and so forth. The decision part 14 determines the sales price of an image, for example, on the basis of the degree of rarity of the image, the degree of rarity of the scene, and so forth.

The provision part 15 sells an image to the user of a terminal 20 at a sales price decided by the decision part 14. The provision part 15 transmits an image and a tag corresponding to the image to the user of a terminal 20 who purchases the image.

The transmission and reception part 16 performs communication with a terminal 20, the in-vehicle apparatus 30, or the external server 40. The transmission and reception part 16 transmits, for example, an image with information indicating a scene determined by the determination part 13 attached to the image to a terminal 20.

«Terminal 20»

Each of the terminals 20 includes a reception part 21, a control part 22, and a transmission and recession part 23. These parts represent functions implemented by processes performed by a CPU of the terminal 20 according to one or more programs installed in the terminal 20.

The reception part 21 receives various operations performed by the user. The reception part 21 receives, for example, an operation performed by the user to perform an adjustment on an image to be sold via the server 10, a tag, and so forth. In addition, the reception part 21 receives, for example, an operation performed by the user to search for an image sold via the server 10, an operation performed by the user to purchase the image, and so forth.

The control part 22 performs, for example, a process to display, on the basis of information received from the server 10, the information on a display screen. In addition, the control part 22 performs various processes, for example, in response to the user's operations received via the reception part 21.

The transmission and reception part 23 performs communication with the server 10 according to an instruction that is input from the control part 22.

<Processes>

Figure 4:
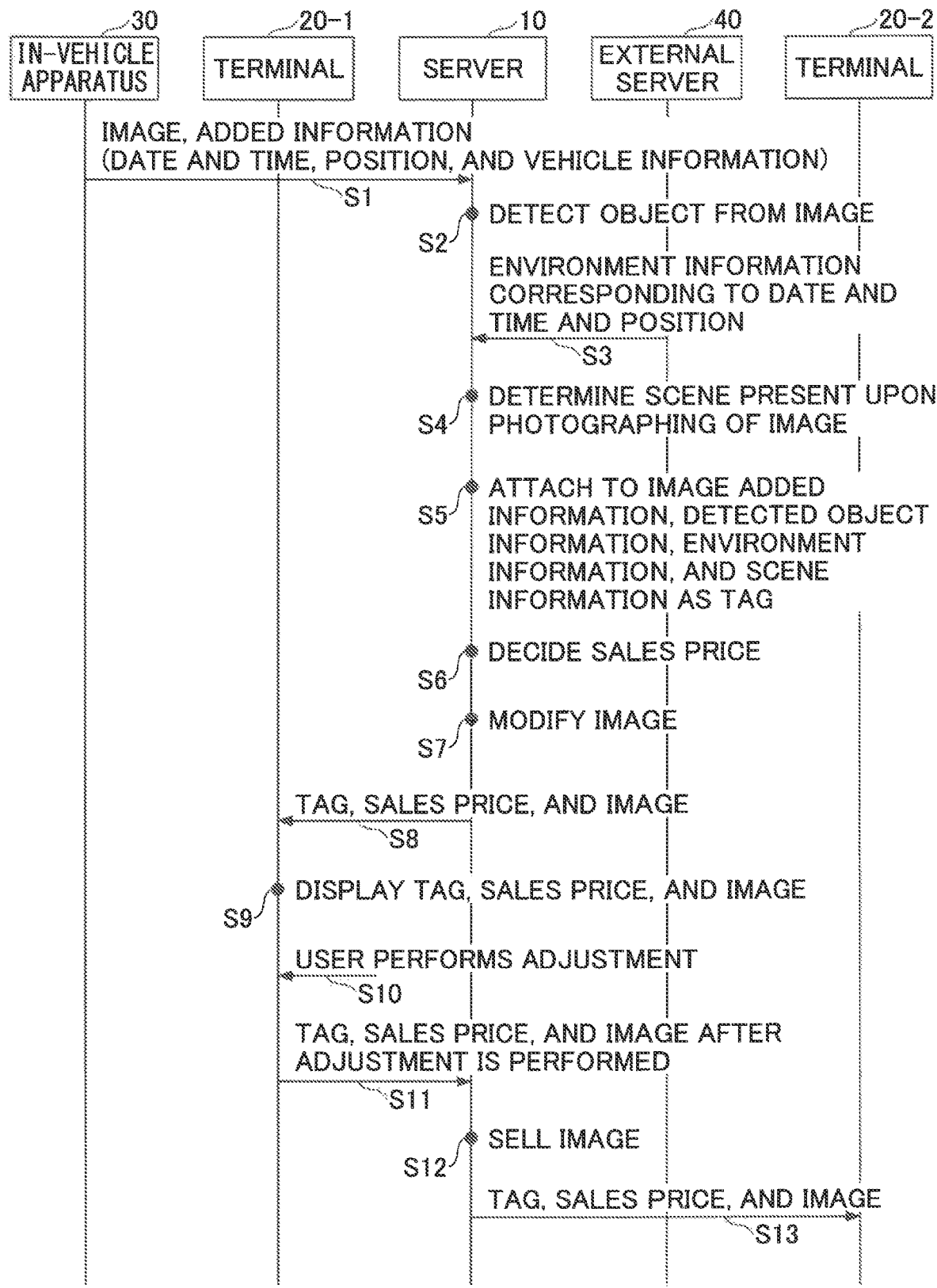
FIG. 4 is a sequence diagram illustrating one example of processes of the image delivery system according to the embodiment.
Figure 6:
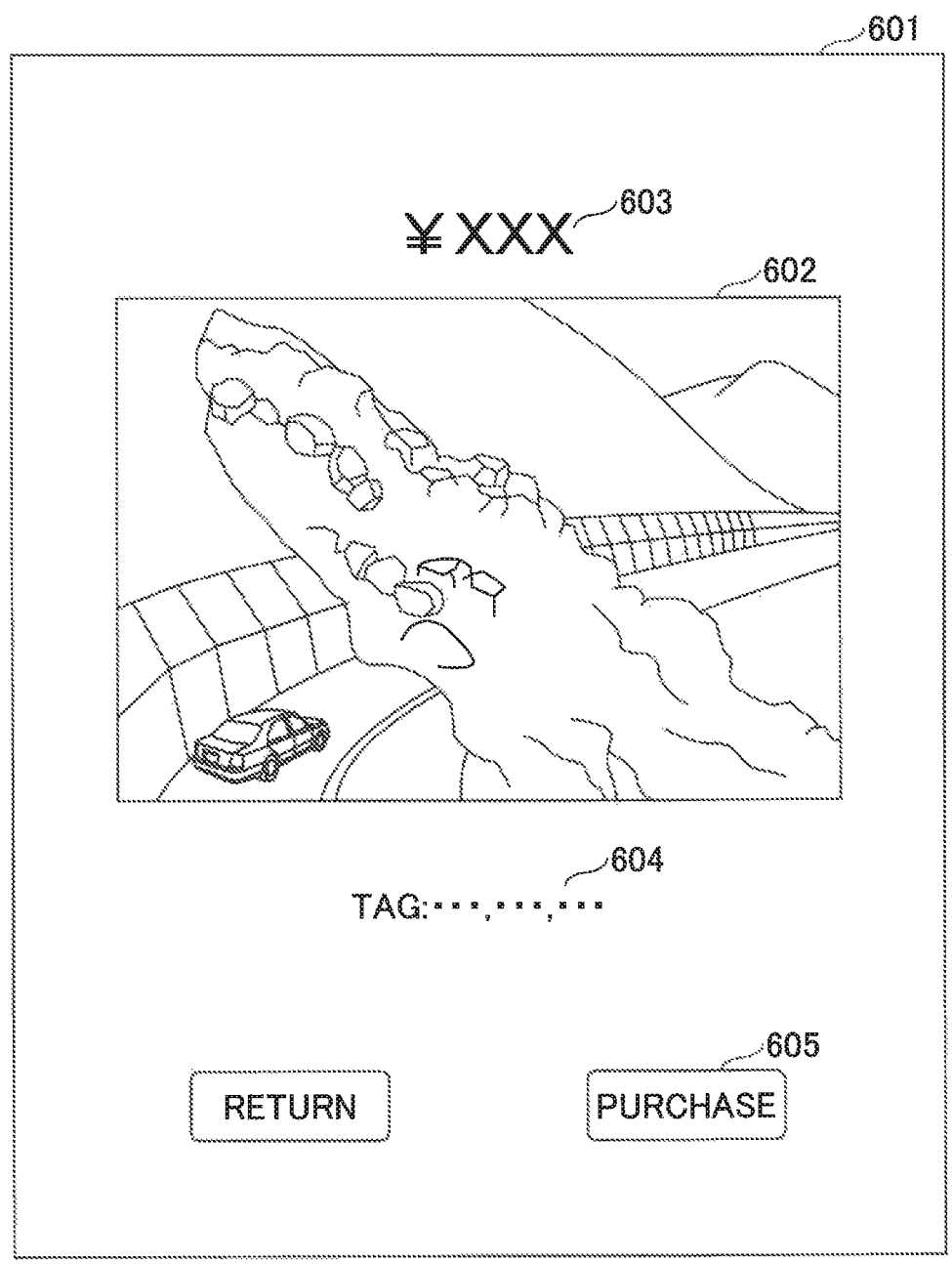

Next, with reference to FIGS. 4-6, processes of the image delivery system 1 according to the embodiment will be described. FIG. 1 is a sequence diagram illustrating one example of processes of the image delivery system 1 according to the embodiment.

In step S1, the in-vehicle apparatus 30 stores an image (a moving image or a static image) taken (by photography) and added information obtained upon the taking of the image in a recording medium such as a SD card, and uploads the image and the added information to the server 10. The added information includes date and time information concerning the time at which the image is taken, position information concerning the position at which the image is taken, and information (i.e., vehicle information) concerning traveling of the vehicle 301 at the time when the image is taken. The position information may be, for example, information of a latitude and a longitude obtained from a GPS (Global Positioning System) or the like.

Information concerning traveling of the vehicle 301 includes the speed of the vehicle 301; the acceleration of the vehicle 301; driving operation information such as information concerning a driver's brake operation, a driver's steering operation, a driver's accelerator operation, and so forth; and information concerning actuating of predetermined traveling functions such as actuating of a function of an ABS (Antilock Brake System) and a function of a TRC (TRaction Control) of the vehicle 301. The in-vehicle apparatus 30 may start taking the moving image, for example, in response to turning on of the ACC (accessory) power supply, and may upload the moving image taken (by photography) to the server 10 in response to turning off of the ACC power supply.

Note that in response to a detection of a predetermined event or in response to a satisfaction of a condition provided by the server 10, the in-vehicle apparatus 30 may upload the image to the server 10. A detection of a predetermined event may be, for example, a detection of one or more events included in the vehicle information such as a detection of a predetermined driver's operation such as a sudden braking operation or an abrupt steering operation, or a detection of an acceleration greater than or equal to a predetermined threshold corresponding to a collision of the vehicle 301 or the like. A condition provided by the server 10 may be, for example, a date and time, a position, or the like indicated by the server 10.

Note that a terminal 20 may upload an image and added information of the image to the server 10. In this case, for example, the terminal 20 may read data of images from a recording medium such as a SD card where images taken (by photography) by the in-vehicle apparatus 30 are recorded and tray display the read images on a display screen, and may upload an image selected from the displayed images and the corresponding added information to the server 10.

Next, the determination part 13 of the server 10 performs an image recognition process on the image, obtained by the obtaining part 12, to detect a predetermined object from the image (step S2). More specifically, the determination part 13 of the server 10 detects from the image an object such as a pedestrian, a vehicle, a road cone, a bicycle, a motorcycle, a traffic light, or a traffic sign. In a case where the image is a moving image, the determination part 13 of the server 10 may perform the processes that will be described below on one or more frames included in the moving image (for example, each key frame not compressed among frames).

Next, the obtaining part 12 of the server 10 obtains from the external server 40 information of surroundings of the vehicle 301 (hereinafter, referred to as "environmental information" as appropriate), obtained when the image is taken, corresponding to the date and time information and the position information included in the added information (step S3). The obtaining part 12 of the server 10 obtains, as the environmental information, climate information, traffic information, disaster information, and facility information obtained at the date and time and position at which the image is taken. The climate information may include information such as information of the ambient temperature, the humidity, the weather, or a typhoon. The traffic information may include information such as information of, for example, an accident, a traffic jam, or road construction work. The disaster information may include, for example, information of an earthquake, falling of a bluff, a fire, a tsunami, or a flood. The facility information may include information of, for example, a nearby store.

Next, the determination part 13 of the server 10 determines a scene (step S4). In this regard, the determination part 13 of the server 10 uses, for example, AI (Artificial Intelligence) or the like to determine a scene present when the image is taken on the basis of at least one of the result of image recognition of the image obtained from step S2, the environmental information of the image obtained from step S3, and the added information of the image.

The determination part 13 of the server 10 may determine, for example, that the scene is a scene of an "accident of a rear-end collision during a standstill of the vehicle", for a case where, on the basis of the information concerning traveling of the vehicle 301 included in the added information, an acceleration greater than or equal to a predetermined threshold corresponding to a collision of the vehicle 301 or the like is detected when a brake operation has been performed by the driver of the vehicle 301 or the speed of the vehicle 301 has been zero.

The determination part 13 of the server 10 may determine, for example, that the scene is a scene of "a skid of the vehicle during traveling of the vehicle at a high speed", for a case where, on the basis of the information concerning traveling of the vehicle 301, the speed of the vehicle 301 is greater than or equal to a predetermined threshold, the ABS is actuated, and a brake operation is performed by the driver of the vehicle 301 with the strength greater than or equal to a predetermined threshold.

The determination part 13 of the server 10 may determine, for example, that the scene is a scene of "a collision accident due to a skid of the vehicle", for a case where the ABS is actuated and an acceleration greater than or equal to a predetermined threshold corresponding to a collision of the vehicle 301 or the like is detected.

The determination part 13 of the server 10 may determine, for example, that the scene is a scene of "a rear-end collision accident due to drowsy driving or the like" for a case where the amount of a driver's steering operation is less than or equal to a predetermined threshold, the amount of a driver's brake operation is less than or equal to a predetermined threshold, and an acceleration greater than or equal to a predetermined threshold corresponding to a collision of the vehicle 301 is detected.

Moreover, the determination part 13 of the server 10 may determine, for example, that the scene is a scene of "an occurrence of an accident at the traffic intersection A", for a case where a traffic accident is detected from image recognition and the image is taken at the traffic intersection A.

The determination part 13 of the server 10 may determine, for example, that the scene is a scene of "an occurrence of a skid due to road surface freezing at the traffic intersection A", for a case where the ambient temperature is minus 3 degrees according to the climate information included in the environmental information, the ABS is actuated according to the information concerning traveling of the vehicle 301 included in the added information, and a traffic accident is detected from image recognition.

Moreover, the determination part 13 of the server 10 may determine, for example, that the scene is a scene, for example, in which "there is a need to wait for 30 minutes to enter the shop B", for a case where a line of persons is detected from image recognition and the image is taken at the shop B.

The determination part 13 of the server 10 may determine, for example, that the scene is a scene, for example, in which "a lane restriction is implemented at the address D due to construction work", for a case where construction work is detected from image recognition and the image is taken at the address D.

Next, the determination part 13 of the server 10 attaches, as a tag, the added information of the image, information of the object obtained from step S2, the environmental information obtained from step S3, and information of the scene obtained from step S4, to the image (step S5).

Next, on the basis of the degree of rarity (the occurrence frequency) of the image and the degree of freshness of the image, the decision part 14 of the server 10 decides an assessed price of a sales price (or a sales value) (step S6). In this regard, for example, the decision part 14 of the server 10 may decide a higher assessed price as the degree of rarity of the image and the degree of freshness of the image are higher. Note that a sales price may be a money amount, or points exchangeable with a predetermined service or a predetermined product by the server 10.

The decision part 14 of the server 10 may determine, for example, that the degree of rarity of the image is higher as the number of images registered as image information 111 that are similar to the image and correspond to positions included in a link (i.e., a road section) between two nodes (i.e., between two traffic intersections) in map data is smaller. In this case, the decision part 14 of the server 10 may determine that one image is similar to an other image for a case where the difference between an object and a scene detected from the one image and an object and a scene detected from the other image is less than or equal to a predetermined threshold.

Moreover, the decision part 14 of the server 10 may determine the degree of rarity of the image according to, for example, the scene of the image and previously set degrees of rarity of various scenes. In this case, the decision part 14 of the server 10 determines, for example, that an image of an accident has the degree of rarity "10" in a case where the previously set degree of rarity of a scene "an accident" is "10".

Moreover, the decision part 14 of the server 10 may determine, for example, that the degree of freshness of the image is higher as the date and time at which the image is taken is later. The decision part 14 of the server 10 may determine, for example, that the degree of freshness of the image is higher as the difference between the date and time at which the image is taken and the date and time of an occurrence of an accident (that is an example of an event) or a disaster (that is another example of an event) such as an earthquake, falling of a bluff, a fire, a tsunami, or a flood, included in the environmental information obtained from step S3 corresponding to the date and time at which the image is taken, is smaller. As a result, for example, it is possible to set a higher sales price for an image that is the first report of an accident or the like.

Moreover, the decision part 14 of the server 10 may decide the assessed price of the sales price of the image according to, for example, the degree of credibility of a user who provides the image. In this case, the decision part 14 of the server 10 may decide the degree of credibility for the user on the basis of, for example, the contents of an adjustment performed by the user on an image of which the user had previously permitted selling and a corresponding tag. For example, the decision part 14 may set a higher degree of credibility for a user who performed an adjustment on an image to degrade the visibility of personal information that had not been deleted in the image modified by the server 10 or for a user who performed an adjustment on a tag generated by the server 10 to improve the preciseness of the tag.

Next, the provision part 15 of the server 10 modifies the image for protecting personal information or the like (step S7). In this regard, the provision part 15 of the server 10 may perform, for example, a process to pixelate a face of a person, a license plate, or the like included in the image.

Next, the provision part 15 of the server 10 transmits the tag attached to the image in step S5, the assessed price of the sales price of the image determined in step S6, and the image modified in step S7 to the terminal 20-1 of the user of the in-vehicle apparatus 30 (step S8).

Next, the control part 22 of the terminal 20-1 displays on the display screen, the tag of the image, the sales price of the image, and the modified image (step S9).

Next, the reception part 21 of the terminal 20-1 receives the user's operation to perform an adjustment on the tag, the sales price, and the modified image (step S10). Note that, in a case where the user of the terminal 20-1 determines not to perform such an adjustment, the user's operation to perform an adjustment on the tag, the sales price, and the modified image is not needed.

Next, the control part 22 of the terminal 20-1 responds to the user's operation to perform an adjustment on the tag, the sales price, and the modified image; and transmits to the server 10 the tag, the sales price, and the modified image on each of which the adjustment has been performed (step S11). Note that in response to receiving, if any, the user's operation to deny selling the modified image, the control part 22 of the terminal 20-1 sends information indicating the denial to the server 10. Then, the provision part 15 of the server 10 deletes the data concerning the modified image selling which is thus denied.

Next, the provision part 15 of the server 10 permits selling the modified image to the other terminal 20-2 or the like (step S12). FIG. 5 illustrates one example of image information 111 according to the present embodiment. In the example of the image information 111 illustrated in FIG. 5, for an image for which the user of a terminal 20 permits selling, the image, a tag, a sales price, and a user ID are stored where the image, tag, sales price, and user ID are associated with the image ID. An image ID is identification information to identify an image taken (by photography) by the in-vehicle apparatus 30. An "image" is an image taken (by photography) by the in-vehicle apparatus 30, a modified image obtained from step S7, or an image on which an adjustment is performed in step S11. A "user ID" is identification information to identify a user who has uploaded an image to the server 10 from the in-vehicle apparatus 30 or the like.

Next, the provision part 15 of the server 10 responds to an operation of the user of the terminal 20-2 to transmit the image indicated by the user, with the tag, the sales price, and so forth of the image to the terminal 20-2 (step S13). FIG. 6 illustrates an example of a display screen 601 of the terminal 20-2 with which the user of the terminal 20-2 can purchase an image or the like. In the example of FIG. 6, on the display screen 601 of the terminal 20-2, a thumbnail of an image 602, a sales price 603, a tag 604, a "purchase" button 605, and so forth are displayed. The provision part 15 of the server 10 responds to a pressing operation of the user of the terminal 20-2 on the purchase button 605 to transmit the image concerning the thumbnail 602 and the tag of the image to the terminal 20-2. Note that the terminal 20-2 may be able to previously register with the server 10 a search condition for an image. In this case, in response to the image that satisfies the registered condition becoming purchasable, the provision part 15 of the server 10 may send this information to the terminal 20-2.

Note that the server 10 may send information indicating a selling result of an image that has been uploaded by the user of the terminal 20-1 at a predetermined timing (for example, every month) to the terminal 20-1.

Thus, the information processing apparatus, the image delivery system, the information processing method, and the computer-readable recording medium have been described as the illustrative embodiments. In this regard, the present invention is not limited to the specifically disclosed embodiments, and various modifications and/or changes may be made within the claimed scope.

The functional parts of the terminals 20 and the server 10 may be implemented, for example, through cloud computing using one or more computers. In addition, at least some of the functions of a terminal 20 may be included in the server 10. In addition, at least some of the functions of the server 10 may be included in a terminal 20. Note that, in the embodiment, the server 10 is one example of an "information processing apparatus", and the provision part 15 is one example of a function "to transmit, information and an image".

DESCRIPTION OF REFERENCE NUMERALS

1: image delivery system
10: server
11: storage part
12: obtaining part
13: determination part
14: decision part
15: provision part
16: transmission and reception part
20: terminal
21: reception part
22: control part
23: transmission and reception part
30: in-vehicle apparatus
40: external server
301: vehicle The present application is based on and claims priority to Japanese patent application No. 2018-033527, filed Feb. 27, 2018, the entire contents of which are hereby incorporated herein by reference.

What is claimed is:

1. An information processing apparatus comprising:
at least one processor configured to:
determine, on the basis of information concerning traveling of a vehicle obtained when an image including surroundings of the vehicle is taken by an image pickup unit of the vehicle, a scene present in the surroundings of the vehicle when the image is taken;
transmit information indicating the determined scene and the image to a terminal connected to the information processing apparatus via a network;
set a sales price of the image on the basis of the determined scene; and
transmit, to the terminal, the image with the information indicating the determined scene and information indicating the determined sales price.

2. The information processing apparatus as claimed in claim 1, wherein
the information concerning traveling of the vehicle includes at least one of a traveling speed of the vehicle, an acceleration of the vehicle, information concerning a driver's driving operation of the vehicle, and information indicating actuating of a predetermined traveling function of the vehicle.

3. The information processing apparatus as claimed in claim 1, wherein the at least one processor is further configured to:
determine the scene is present when the image is taken on the basis of a result of image recognition of the image and information of the surroundings of the vehicle corresponding to a date and time when the image is taken and a position where the image is taken.

4. The information processing apparatus as claimed in claim 2, wherein the at least one processor is further configured to:
determine the scene is present when the image is taken on the basis of a result of image recognition of the image and information of the surroundings of the vehicle corresponding to a date and time when the image is taken and a position where the image is taken.

5. The information processing apparatus as claimed in claim 1, wherein the at least one processor is further configured to:
set the sales price on the basis of an occurrence frequency of the determined scene.

6. The information processing apparatus as claimed in claim 2, wherein the at least one processor is further configured to:
set the sales price on the basis of an occurrence frequency of the determined scene.

7. The information processing apparatus as claimed in claim 3, wherein the at least one processor is further configured to:
set the sales price on the basis of an occurrence frequency of the determined scene.

8. The information processing apparatus as claimed in claim 4, wherein the at least one processor is further configured to:
set the sales price on the basis of an occurrence frequency of the determined scene.

9. The information processing apparatus as claimed in claim 1, wherein the at least one processor is further configured to:
determine a difference between a date and time when the image is taken and a date and time when a predetermined event occurs at a position where the image is taken; and
set the sales price such that the sales price increases as the determined difference decreases.

10. The information processing apparatus as claimed in claim 2, wherein the at least one processor is further configured to:
determine a difference between a date and time when the image is taken and a date and time when a predetermined event occurs at a position where the image is taken; and
set the sales price such that the sales price increases as the determined difference decreases.

11. The information processing apparatus as claimed in claim 3, wherein the at least one processor is further configured to:
determine a difference between the date and time when the image is taken and a date and time when a predetermined event occurs at a position where the image is taken; and
set the sales price such that the sales price increases as the determined difference decreases.

12. The information processing apparatus as claimed in claim 4, wherein the at least one processor is further configured to:
determine a difference between the date and time when the image is taken and a date and time when a predetermined event occurs at a position where the image is taken; and
set the sales price such that the sales price increases as the determined difference decreases.

13. An image delivery system comprising:
a vehicle; and
an information processing apparatus,
wherein
the vehicle transmits an image including surroundings of the vehicle taken by an image pickup unit of the vehicle and information concerning traveling of the vehicle obtained when the image is taken to the information processing apparatus; and
the information processing apparatus includes at least one processor configured to
determine, on the basis of the information concerning traveling of the vehicle obtained when the image is taken, a scene present in the surroundings of the vehicle when the image is taken,
transmit the image with information indicating the determined scene attached to the image to a terminal connected to the information processing apparatus via a network;
set a sales price of the image on the basis of the determined scene; and
transmit, to the terminal, the image with the information indicating the determined scene and information indicating the determined sales price.

14. An information processing method implemented by an information processing apparatus, the information processing method comprising:
determining, by at least one processor of the information processing apparatus, on the basis of information concerning traveling of a vehicle obtained when an image including surroundings of the vehicle is taken by an image pickup unit of the vehicle, a scene present in the surroundings of the vehicle when the image is taken;
transmitting, by at least one processor of the information processing apparatus, the image with information indicating the determined scene attached to the image to a terminal connected to the information processing apparatus via a network;
set a sales price of the image on the basis of the determined scene; and
transmit, to the terminal, the image with the information indicating the determined scene and information indicating the determined sales price.

15. A computer-readable recording medium storing a program that, when executed by at least one processor of an information processing apparatus, causes the at least one processor to perform the information processing method claimed in claim 14.

* * * * *